United States Patent
Kocberber et al.

(10) Patent No.: US 11,816,014 B2
(45) Date of Patent: Nov. 14, 2023

(54) OPTIMIZED RECOMPILATION USING HARDWARE TRACING

(71) Applicant: Oracle International Corporation, Redwood City, CA (US)

(72) Inventors: Ilknur Cansu Kaynak Kocberber, Zurich (CH); Mario Wolczko, San Carlos, CA (US); Thomas Wuerthinger, Zurich (CH)

(73) Assignee: Oracle International Corporation, Redwood City, CA (US)

( * ) Notice: Subject to any disclaimer, the term of this patent is extended or adjusted under 35 U.S.C. 154(b) by 0 days.

(21) Appl. No.: 17/804,288

(22) Filed: May 26, 2022

(65) Prior Publication Data

US 2022/0283925 A1  Sep. 8, 2022

Related U.S. Application Data

(63) Continuation of application No. 16/672,319, filed on Nov. 1, 2019, now Pat. No. 11,347,617, which is a (Continued)

(51) Int. Cl.
*G06F 11/34* (2006.01)
*G06F 8/41* (2018.01)

(52) U.S. Cl.
CPC ............ *G06F 11/3466* (2013.01); *G06F 8/41* (2013.01); *G06F 8/443* (2013.01); *G06F 8/4441* (2013.01); *G06F 8/48* (2013.01)

(58) Field of Classification Search
CPC .......................... G06F 11/3466; G06F 8/41–49
(Continued)

(56) References Cited

U.S. PATENT DOCUMENTS 5,950,003 A 9/1999 Kaneshiro et al.
6,167,536 A 12/2000 Mann
(Continued)

FOREIGN PATENT DOCUMENTS

EP        2390790      11/2011
WO    WO-2013101214 A1 *  7/2013  .............. G06F 11/34

OTHER PUBLICATIONS

Intel, "Intel 64 and IA-32 Architectures Software Developer's Manual—vol. 3", Order No. 325384-066US, Mar. 2018, pp. 1-1680.
(Continued)

*Primary Examiner* — Geoffrey R St Leger
(74) *Attorney, Agent, or Firm* — Robert C. Kowert; Kowert, Hood, Munyon, Rankin & Goetzel, P.C.

(57) ABSTRACT

A tracing controller may utilize a binary execution trace mechanism to trace execution of compiled application machine code. The tracing controller may initiate hardware tracing to gather control-flow hardware traces of a method executing on a processor configured to generate hardware tracing information. The controller may generate a profile based on the hardware tracing information and initiate re-compiling or re-optimizing of the method in response to determining that the new profile differs from the previous profile. The controller may repeatedly profile and re-optimize a method until profiles for the method stabilize. Profiling and hardware tracing of an application may be selectively enabled or disabled allowing the controller to respond to later phase changes in application execution by re-optimizing, thereby potentially improving overall application performance.

20 Claims, 10 Drawing Sheets

Related U.S. Application Data continuation of application No. 15/994,967, filed on May 31, 2018, now Pat. No. 10,466,986.

(60) Provisional application No. 62/650,812, filed on Mar. 30, 2018.

(58) Field of Classification Search
USPC .............. 717/127, 128, 130–135, 140, 145
See application file for complete search history.

(56) References Cited

U.S. PATENT DOCUMENTS

| | | | |
|---|---|---|---|
| 6,314,530 B1 | 11/2001 | Mann | |
| 7,089,403 B2 | 8/2006 | Pechtchanski et al. | |
| 7,240,342 B1 | 7/2007 | Bharadwaj et al. | |
| 7,596,725 B2 | 9/2009 | Agarwala | |
| 7,617,420 B2 | 11/2009 | Kimura | |
| 7,653,899 B1 | 1/2010 | Lindahl et al. | |
| 8,140,903 B2 | 3/2012 | Goodman et al. | |
| 8,359,496 B1 | 1/2013 | Bornstein et al. | |
| 8,502,822 B2 | 8/2013 | Rabin | |
| 9,058,415 B1 | 6/2015 | Serebrin et al. | |
| 9,563,432 B2 | 2/2017 | Segelken et al. | |
| 9,612,809 B2 | 4/2017 | Mahaffey et al. | |
| 9,875,167 B1 | 1/2018 | Norrie et al. | |
| 10,466,986 B2 | 11/2019 | Kocberber et al. | |
| 2002/0138753 A1 | 9/2002 | Munson | |
| 2002/0144241 A1 | 10/2002 | Lueh | |
| 2004/0003384 A1 | 1/2004 | Pechtchanski et al. | |
| 2004/0194077 A1 | 9/2004 | Bharadwaj et al. | |
| 2004/0255282 A1* | 12/2004 | Eruhimov ........... | G06F 11/3447 714/E11.197 |
| 2005/0071826 A1 | 3/2005 | Nistler et al. | |
| 2006/0041791 A1 | 2/2006 | Carroll et al. | |
| 2008/0010550 A1 | 1/2008 | Agarwala | |
| 2008/0162272 A1 | 7/2008 | Huang et al. | |
| 2010/0079463 A1 | 4/2010 | Rabin | |
| 2010/0268995 A1 | 10/2010 | Goodman et al. | |
| 2012/0278793 A1 | 11/2012 | Jalan et al. | |
| 2014/0317382 A1 | 10/2014 | Segelken et al. | |
| 2014/0317606 A1 | 10/2014 | Gataullin et al. | |
| 2015/0347103 A1 | 12/2015 | Mahaffey et al. | |
| 2015/0347263 A1 | 12/2015 | Chau et al. | |
| 2016/0246697 A1 | 8/2016 | Chtrasberg et al. | |
| 2017/0075685 A1* | 3/2017 | Grant ................. | G06F 11/3466 |
| 2018/0365127 A1 | 12/2018 | Gliwa | |

OTHER PUBLICATIONS

Markus Metzger, "Capturing Intel(R) Processor Trace (Intel PT) {#capture}", Retrieved from URL: https://github.com/01org/processor-trace/blob/master/doc/howto_capture.md on May 3, 2018, pp. 1-8.

Christian Haubl, et al, "Context-sensitive Trace Inlining for Java", Preprint submitted to Computer Languages, Systems and Structures, Apr. 18, 2013, pp. 1-24.

Kim Hazelwood, et al., "Adaptive Online Context-Sensitive Inlining", IEEE, Code Generation and Optimization, 2003, pp. 1-12.

Thomas Ball, et al., "Efficient Path Profiling", IEEE, Proceedings of MICRO-29, Dec. 2-4, 1996, pp. 1-12.

Deaho Chen, et al., "Taming Hardware Event Samples for Precise and Versatile Feedback Directed Optimizations", IEEE, Transactions on Computers 62.2, 2013, pp. 376-389.

Inoue, H., et al., "Adaptive Multi-Level Compilation in a Trace-based Java JIT Complier", Proceedings of the ACM International conference on Object oriented programmings systems languages and applications, 2012, pp. 179-194.

Conte, T., et al., "Hardware-Based Profiling: An Effective Technique for Profile-Driven Optimization", International Journal of Parallel Programming, Apr. 1996, vol. 24, Issue 2, pp. 187-206.

* cited by examiner

Context sensitive profile

OPTIMIZED RECOMPILATION USING HARDWARE TRACING

This application is a continuation of U.S. application Ser. No. 16/672,319, filed Nov. 1, 2019, which is a continuation of U.S. application Ser. No. 15/994,967, filed May 31, 2018, now U.S. Pat. No. 10,466,986, which claims benefit of priority to U.S. Provisional Application Ser. No. 62/650,812, filed Mar. 30, 2018, which are incorporated herein by reference in their entirety.

BACKGROUND

Field of the Disclosure

This disclosure relates generally to optimizing software compilers, and more particularly to systems and methods for implementing optimized recompilation using hardware tracing.

Description of the Related Art

The gathering and analysis of processor traces has not generally been of practical utility in production software. Traditionally, applications are profiled using software instrumentation with the compilation and optimization of code in the applications guided using profiles gathered during the execution of the application. However, software instrumentation generally slows the application down, and so is typically used only in the early, warmup phase of code execution. Additionally, hardware tracing has been used to improve performance in the context of static compilation. However, static compilation is performed by the developer and thus cannot respond to changes in application behavior at the end-user site.

There are two common techniques utilized to collect runtime profiles: a) During interpretation of the application code before any machine code is generated, b) In the machine code generated by early compilation tier(s) in multi-tier compilation systems. The profiling in the interpreter takes place as each bytecode instruction is executed in the interpreter, adding to the overall execution time overhead of the interpreter. Moreover, every language interpreter must have its own profiler to feed the optimizing compiler, even though multiple languages can make use of a common compiler infrastructure.

Alternatively, or in addition to the profiling performed during interpretation, profiling can be performed through instrumentation of the machine code generated by an early compilation tier by emitting additional instrumentation into the machine code generated. For example, machine code generated by a tier 1 compiler may emit (or insert) instrumentation code into machine code it generates so as to collect profiling information about events of interest. Augmenting the machine code with instrumentation comes at the cost of extra instructions to execute along with the original program's instructions, slowing down the overall execution.

Thus, profile collection through instrumentation is typically performed in the machine code generated by earlier compilation tiers but not in the final machine code generated to be run after profiling. Additionally, static compilation performed by developers cannot respond to changes in application behavior once the application has been deployed (e.g., at an end-user site).

One potential disadvantage of traditional profile collection mechanisms is that they are typically employed only at the start (i.e., during warmup) of a given program's execution because of their associated performance overheads. Once the necessary profiling information is collected, the compiler generates optimized machine code by utilizing profiling information collected during warmup. When using traditional techniques, there is typically no profiling performed after application warmup (unless the machine code encounters an unexpected scenario, deoptimizes, and falls back to interpretation until the next compilation). Thus, traditional techniques cannot detect the changes that might occur because of a phase change later in the execution of a given program (e.g., due to changes in data distribution) and hence cannot generate machine code optimized to adapt to the behavior of the program in a given period of time.

Another potential disadvantage of existing profiling mechanisms is a lack of context-sensitivity. Profiling information associated with an instruction in a method may not be differentiated based on how the program arrived at that point in the execution. Instead collected profiles are averaged across all paths leading to that instruction. This may cause the compiler to miss optimization opportunities while generating machine code, which potentially results in suboptimal performance.

SUMMARY

Described herein are various methods, techniques and/or mechanisms for optimized recompilation using hardware tracing. Gathering and analyzing processor traces has been used in computer design and processor architecture research, but is generally not of practical utility in production software. A binary execution trace mechanism may allow software to gather control-flow traces at low overhead utilizing hardware tracing, according to various embodiments described herein.

As noted above, existing profiling techniques (e.g., such as by using software instrumentation) may reduce or degrade performance (e.g., slowdown) of an executing application. However, by utilizing a binary execution trace mechanism configured to provide hardware tracing, an executing application program may be profiled at any time during execution. Additionally, an application may be profiled (and thus recompiled and/or reoptimized) while executing in a production environment (e.g., after being deployed at customer/client site, when using real data, etc.). This may allow later phase changes (e.g., changes that occur during execution), to be detected and responded to, potentially improving overall performance.

To overcome the drawbacks of traditional profiling techniques, binary tracing of the compiled machine code may be employed for low-overhead and context-sensitive profiling, such as by using hardware tracing features available in modern processors. As one example, Intel's recent processors may be equipped with hardware support to provide application execution traces, such as Branch Trace Store, Last Branch Records, and Processor Trace. Although the encoding of the execution traces may differ among various tracing mechanisms, they all may provide information about the control flow of an executing binary, such as branch directions (i.e., branch taken or not taken), target addresses of direct calls, indirect calls and jumps. The profiles extracted from the hardware-provided execution traces may then be utilized by the compiler when performing optimizations based on these newly generated profiles.

One potential benefit of binary (e.g., machine code) tracing in hardware is that it shifts the instrumentation out of the thread under observation into an observer thread. Thus, performance of the observed thread may be minimally degraded according to some embodiments. Additionally, tracing information generated using the techniques described herein may be generated independent of any instrumentation instructions included in the application (and upon which other profiles may be based). In some embodiments, hardware tracing information may be processed, such as to extract and summarize the profiling information to be utilized by the compiler. Moreover, binary tracing may be turned on and off dynamically during application execution, so once the profiles stabilize tracing may be turned off at least temporarily and potentially turned on again if needed—something which static instrumentation is not generally capable of.

Another potential benefit of binary tracing is its ability to be able to detect and adjust to later phase changes (e.g., changes to application execution, execution paths, etc.) without falling back to interpretation. Finally, because binary (e.g., machine code) tracing can be used to profile already compiled machine code, it may provide context-sensitive profiles of the methods that are already inlined in their caller method (if the compiler performed any inlining based on the previous profiles it was provided with during compilation of the method that is traced). Thus, there may be no extra implementation effort necessary to provide context sensitivity, according to some embodiments. Additionally, multiple interpreters using the same compiler infrastructure may utilize the profiling information extracted with binary tracing in hardware.

Figure 1:
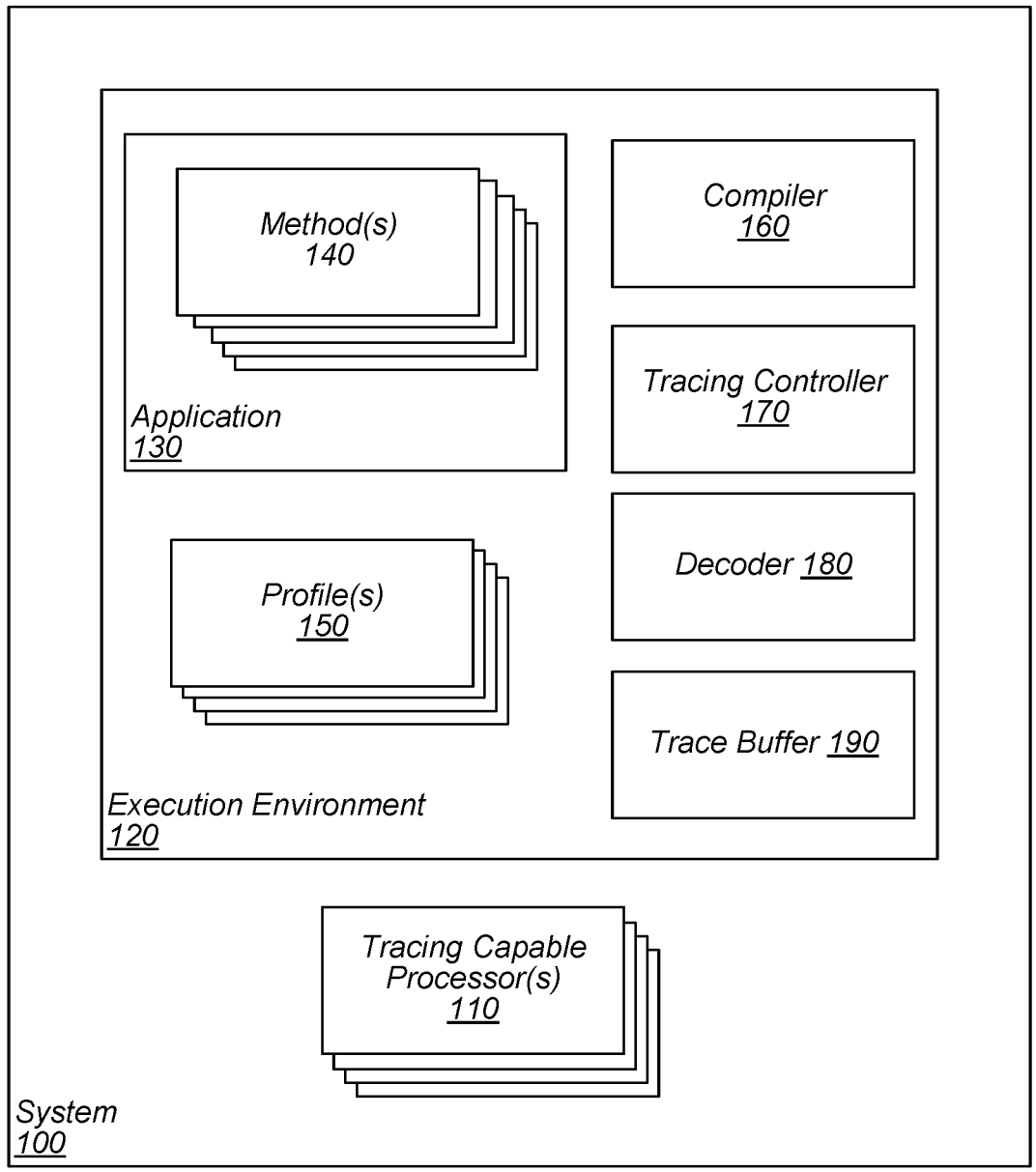
FIG. 1 is a logical block diagram illustrating a system configured to implement optimized recompilation using hardware tracing as described herein, according to one embodiment.

While the disclosure is described herein by way of example for several embodiments and illustrative drawings, those skilled in the art will recognize that the disclosure is not limited to embodiments or drawings described. It should be understood that the drawings and detailed description hereto are not intended to limit the disclosure to the particular form disclosed, but on the contrary, the disclosure is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF EMBODIMENTS

This disclosure describes various methods, techniques and/or mechanisms for implementing optimized recompilation using hardware tracing, according to various embodiments. Modern execution environments, such as virtual machines (VMs) in some embodiments, typically rely on self-observation to examine their behavior and then utilize these observations to improve performance. Traditionally, execution environments may exploit two different observation approaches. Firstly, by noting a specific event at a specific point in an executing program or application. Secondly, by counting occurrences of events across various regions of the program.

For example, conventional interrupt-driven profiling may gather call stack information at timer-driven interrupts, loop trip counts may trigger recompilation, and/or type histograms may be gathered by polymorphic inline caches. However, to obtain a higher level of performance it may be necessary to obtain additional information about an event, such as information describing how the program arrived at that point in the code. For example, optimizing a hot loop (e.g., a loop in executing source code that accounts for a relatively large amount of an application's overall execution time) containing complex control flow may involve identifying common paths and special-casing optimization of the paths (of each path in some embodiments). While a variety of ad-hoc techniques may be used to address specific situations or approaches, utilizing adaptive profiling and/or optimized recompilation using hardware tracing may, in some embodiments, provide a general technique usable in a wide variety of situations.

In the following detailed description, numerous specific details are set forth to provide a thorough understanding of claimed subject matter. However, it will be understood by those skilled in the art that claimed subject matter may be practiced without these specific details. In other instances, methods, apparatuses or systems are not described in detail below because they are known by one of ordinary skill in the art in order not to obscure claimed subject matter.

While various embodiments are described herein by way of example for several embodiments and illustrative drawings, those skilled in the art will recognize that embodiments are not limited to the embodiments or drawings described. It should be understood that the drawings and detailed description thereto are not intended to limit the embodiments to the particular form disclosed, but on the contrary, the intention is to cover all modifications, equivalents and alternatives falling within the spirit and scope of the disclosure. Any headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In some embodiments, the techniques described herein may be implemented on a system including one or more processors that are configured to generate hardware tracing information for an application executing on the processor(s). FIG. 1 is a logical block diagram illustrating a system configured to implement optimized recompilation using hardware tracing, according to one embodiment. As illustrated in FIG. 1, system 100 may include one or more tracing capable processors 110. For instance, a processor 110 may be equipped with features to extract execution traces of executing application binaries. As merely one example embodiment, an Intel x86 processor may provide different binary execution trace mechanisms, such as Processor Trace (PT), Last Branch Records (LBR) and Branch Trace Store (BTS). Other processor manufacturers (e.g., AMD, ARM) may provide similar capabilities in their processors.

System 100 may also include an execution environment 120 configured to support the execution of one or more applications, programs and/or other software. For example, in some embodiments execution environment 120 may be a virtual machine (VM) and/or an adaptively-optimizing VM. Execution environment 120 may execute one or more service threads, such as for compilation, garbage collection, etc., as well as one or more application threads. In some embodiments, execution environment 120 may be considered a combination of a hardware tracing processor and an operating system configured to exploit that capability.

Executing within execution environment 120 may be one or more applications 130 including one or more methods 140. In some embodiments, application 130 and/or methods 140 may be compiled, optimized, traced, profiled, recompiled and/or reoptimized according to the techniques described herein. Compiler 160 may represent one or more compiler modules and/or any of various types of compilers, such as an optimizing dynamic compiler, a multi-tier compilation system, a just-in-time compiler, etc., according to various embodiments. Compiler 160 may be configured to compile and/or optimize source code for application 130 and/or methods 140.

System 100 may also include tracing controller 170, which may be configured to manage, direct, control and/or orchestrate hardware binary tracing performed on the machine code resulting from compilation of application 130 and/or methods 140. For example, in some embodiments tracing controller 170 may be configured to interact with compiler 160, processor(s) 110, decoder 180 and/or trace buffer 190 to collect hardware traces, generate profiles as well as initiate recompilation and/or re-optimization of individual ones of methods 140. Thus, in some embodiments tracing controller 170 may orchestrate tracing actions and pass new profiles to the compiler to be used for compilation.

In some embodiments, a binary execution trace mechanism, such as may be implemented by processors 110, may be configured to trace individual applications, operating system (OS) code, hypervisors and/or execution environments (e.g., VMs) running under a hypervisor. However, different binary execution trace mechanisms may differ in how they encode the traces, whether traces can be recorded continuously or sampled, and/or the relative performance overhead imposed on an application being traced. The techniques described herein may also be implemented using various binary execution tracing mechanisms according to different embodiments. However, the techniques are described herein in terms of Processor Trace (PT) as one example and for brevity of explication. Processor Trace (PT) is one example of a binary execution trace mechanism of processor 110 that may be configured to gather control flow traces of individual methods 140 of application 130. When active for a particular hardware thread, a binary execution trace mechanism may write a trace of the method's execution into memory, such as into trace buffer 190. Subsequently, post-processing software, such as tracing controller 170 and/or decoder 180, may use as input to reconstruct the control flow of that thread.

In some embodiments, a binary execution trace mechanism may emit tracing data at a high data rate, potentially overwhelming secondary storage subsystems. For instance, in one example embodiment, a binary execution trace mechanism may generate up to 500 MB of trace data per second thereby potentially slowing down the traced program by 2-7%. In another example embodiment, Linux perf was utilized to gather a trace for a complete execution of the Richards benchmarks on Truffle/JavaScript, obtaining a 1.6 GB trace in 5 s of execution. Thus, in some embodiments, tracing data may be held in memory, such as in trace buffer 190 and consumed from RAM, thereby potentially limiting the trace length (e.g., to some seconds of execution). Additionally, in some embodiments, trace-gathering may be limited (e.g., to methods of interest), such as to prevent overwhelming amounts of data being emitted.

Thus, when hardware tracing an executing method, processor 110 may store tracing information in an encoded form, such as to reduce the amount of emitted data. For instance, in some embodiments, the direction of each branch (i.e., branch taken or not taken) encountered during execution may be encoded by a single bit. This potentially minimizes the data rate and/or overall data size required for tracing, but consequently may place a burden on decoding software.

Decoder 180 may be, or may include, one or more modules configured to decode tracing information (i.e., reconstruct the control flow, such as to extract profiles from the recorded traces) generated by a binary execution trace mechanism. In one embodiment, decoder 180 may represent a decoder library that is either part of, or separate from tracing controller 170. Please note that when tracing a thread, processor 110 may be instructed and/or configured to trace execution of a particular method 140 of application 130, as will be described in more detail subsequently.

Various types of data (i.e., tracing information) may be recorded in the trace and stored within trace buffer 190, such as outcomes of conditional branches, target addresses of indirect jumps and calls, sources and/or targets of asynchronous control transfers (e.g., exceptions, interrupts), as well as much additional detail, according to various embodiments. In some embodiments, a binary execution trace mechanism may avoid generating trace information that could otherwise be determined, such as by inspection, from the static binary (e.g., machine code). For example, execution of unconditional branches or direct calls may not be recorded in some embodiments. The trace data may be fed back into subsequent compilations, as profile(s) 150, when recompiling and/or reoptimizing one or more of methods 140 and/or application 130.

While described herein generally as compiling, tracing, profiling, optimizing, recompiling and/or reoptimizing individual methods 140 of application 130, the methods, mechanisms and/or techniques described herein may also be applied to virtually any suitable portion of code being executed on processor(s) 110, according to various embodiments. While illustrated in FIG. 1 as separate modules, in some embodiments one or more of compiler 160, tracing controller 170 and/or decoder 180 may be implemented in a combined fashion as a single module. Additionally, compiler 160, tracing controller 170 and/or decoder 180 are merely logical descriptions intended to aid in explanation and understanding of the methods, mechanisms and techniques described herein. In some embodiments, tracing controller 170 may include, or be part of, compiler 160. In other embodiments, compiler 160 may include, or be part of, tracing controller 170. In yet other embodiments, tracing controller 170 may be separate from, but may be configured to communicate and/or coordinate with, compiler 160 and/or decoder 180. Thus, features and/or techniques described herein as being performed by any of compiler 160, tracing controller 170 and/or decoder 180 may, in some embodiments, be performed by a different one of compiler 160, tracing controller 170 and/or decoder 180.

Figure 2:
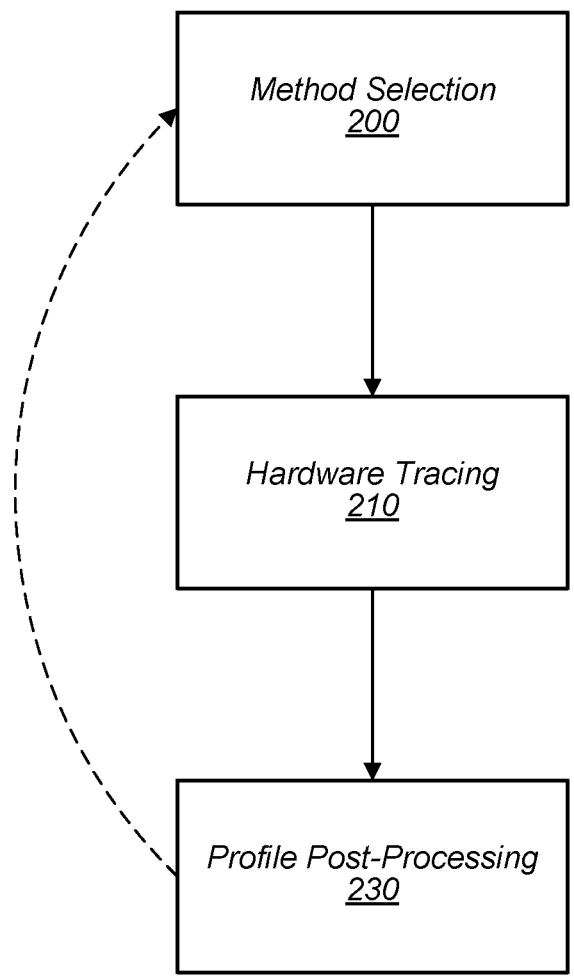
FIG. 2 is a logical block diagram illustrating a binary tracing control flow loop, as in one embodiment.

FIG. 2 is a logical block diagram illustrating a binary tracing controller loop, according to one embodiment. When implementing optimized recompilation using hardware tracing, as described herein, tracing controller 170 (and/or compiler 160) may be configured to repeatedly select one or more of methods 140, as shown in block 200, enable hardware tracing of the selected methods, as in block 210 and generate profiles by post-processing the gathered trace information, as in block 230, according to one embodiment. Thus, tracing controller 170 may profile application 130 in an iterative manner.

Tracing controller 170 may utilize any of various manners to select which methods of an application to trace and profile, according to various embodiments. For example, in some embodiments tracing controller 180 and/or compiler 160 may be configured to select which methods of application 130 to trace and/or in what order to trace those methods based on the method's respective contribution to the total execution time (or the total instruction count) of the application, as will be described in more detail herein.

In some embodiments, a controller loop (and/or tracing controller 170) implementing the techniques described herein may be executing in a stand-alone virtual machine thread (e.g., within execution environment 120). The controller loop may start when the application starts and may terminate at, or before, application termination. For example, in some embodiments the controller loop may end before the application terminates if the methods being profiled stabilize before the application terminates, as will be described in more detail subsequently.

Figure 3:
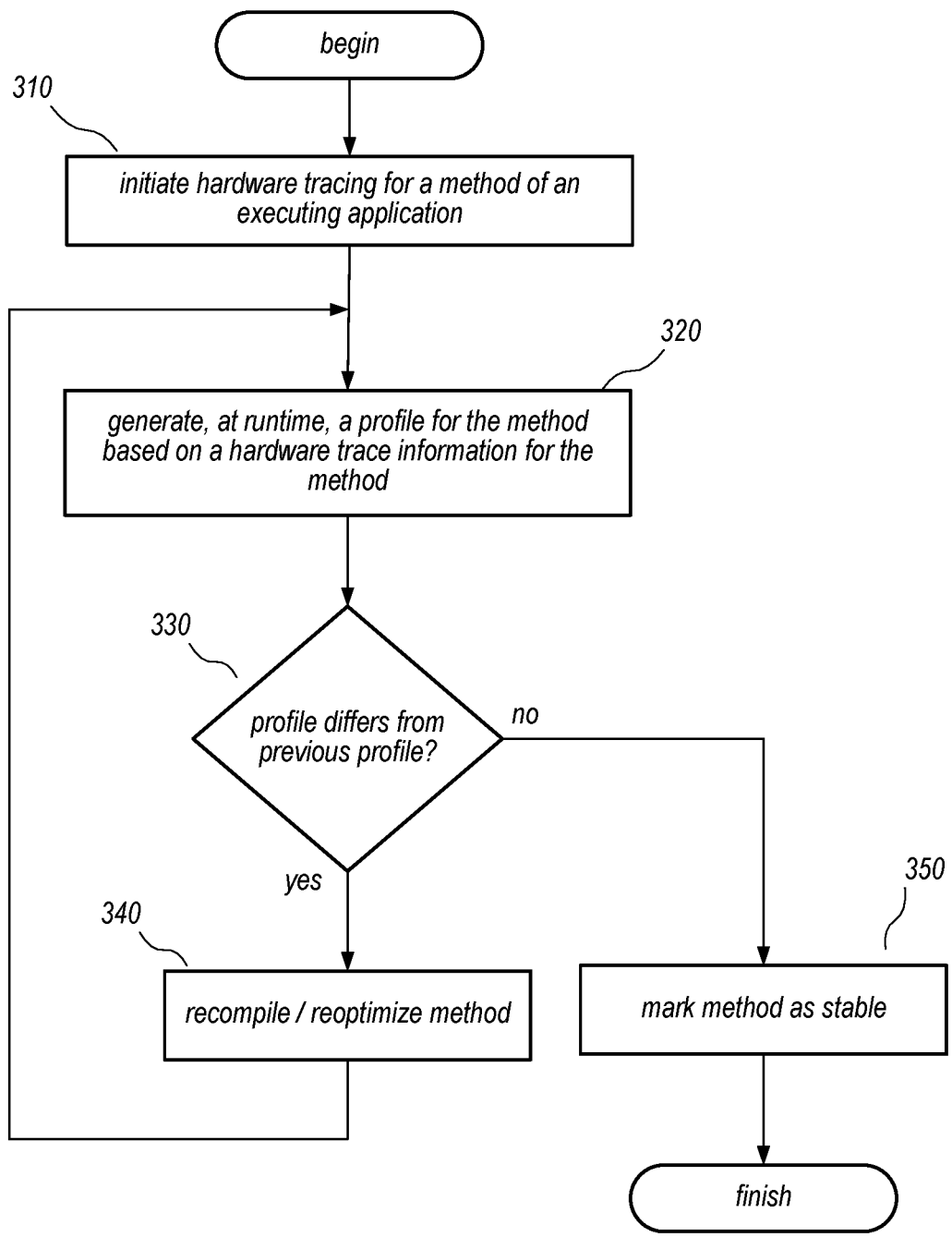
FIG. 3 is a flowchart illustrating one embodiment of a method for optimized recompilation of a method using hardware tracing.

FIG. 3 is a flowchart illustrating one embodiment of a method for optimized recompilation of a method using hardware tracing, according to one embodiment. As illustrated by block 310, tracing controller 170, may initiate non-instrumentation based hardware tracing of a method of an application executing within execution environment 120. For instance, the application may be executing on a system (e.g., a combination of a hardware tracing processor and an operating system configured to exploit that capability) which is configured to provide one or more binary execution trace mechanisms.

The application and/or the method may have been previously compiled and or optimized, such as based on static optimization mechanisms and/or software instrumentation of the application and/or method. Thus, the hardware tracing may be performed on compiled (and possibly optimized) machine code of the method. Additionally, the method may be one of multiple methods being traced simultaneously.

The tracing controller 170 may instruct one or more processors (on which the application is executing) to initiate hardware tracing of the method 140, which may be referred to herein as the traced method. In response, the processor(s) may extract execution traces of the method while the application is executing. Various types of data may be recorded in the trace, such as outcomes of conditional branches, target addresses of indirect jumps and calls, as well as sources and targets of asynchronous control transfers (e.g., exceptions, interrupts), as will be described in more detail subsequently. The hardware based tracing may not include, nor rely, on any specific instrumentation of the application (e.g., software instrumentation), in some embodiments, and may occur while the application is live—that is executing in a real, not a test or simulated, execution environment, possibly using real data. In other words, instead of being profiled by the developer in a test or simulation environment, the application may be profiled while it is executing at the customer/client site using real customer/client data (e.g., in production).

As shown by block 320, tracing controller 170 may generate a profile for the method based at least in part on a control flow trace of the method created by the hardware tracing of the method. In some embodiments, generating a profile may involve decoding the trace data (e.g., reconstructing the control flow) from the hardware tracing, such as by decoder 180. Additionally, tracing controller 170 may map the profile details and/or other trace information to the application's source code, based on source code positions propagated through the compilation pipeline and associated with their corresponding instructions in the machine code being executed.

If, as indicated by the positive output of decision block 330, the newly generated profile differs from the previous profile, the tracing controller 170 may initiate a recompiling and/or reoptimizing of the method, as shown in block 340. In some embodiments, the tracing controller 170 may compare the profile with a previously generated profile for the method. For instance, the previously generated profile might be provided by an earlier stage in the compilation pipeline or an earlier hardware-based profiling session to be used for the compilation of the method of interest. The threshold used to determine whether two profiles differ enough to warrant recompiling and/or reoptimizing may be configurable and may vary from embodiment to embodiment. Thus, if the new profile differs more than the threshold amount from the previously generated profile, the tracing controller 170 may recompile/reoptimize the method and may then proceed to profile the method again, as indicated by the arrow from block 340 to block 320.

Alternatively, if the newly generated profile does not differ (e.g., more than the threshold amount) from the previously generated profile, as indicated by the negative output of decision block 330, tracing controller 170 may mark the method as stable, as shown in block 350. For example, the tracing controller 170 may maintain a table of methods to be profiled and may indicate within the table that the method is stable (e.g., does not differ significantly from the previously generated profile). The tracing controller 170 may at least temporarily discontinue profiling/tracing a method that has been marked as stable (or may instruct the processor to discontinue profiling/tracing the method), but may again profile/trace a method marked once marked as stable if conditions warrant, such as after a certain amount of execution time has passed since the method was last profiled/traced, if performance of the application/method changes significantly, etc.

Tracing controller 170 may then continue profiling the application. For instance, if tracing controller 170 marked the method as stable, the tracing controller 170 may continue to profile/trace the application without profiling/tracing the same method. If, however, tracing controller 170 initiated a recompilation/reoptimization of the method, the tracing controller 170 may continue to profile/trace the application including profiling/tracing the same method again.

Figure 4:
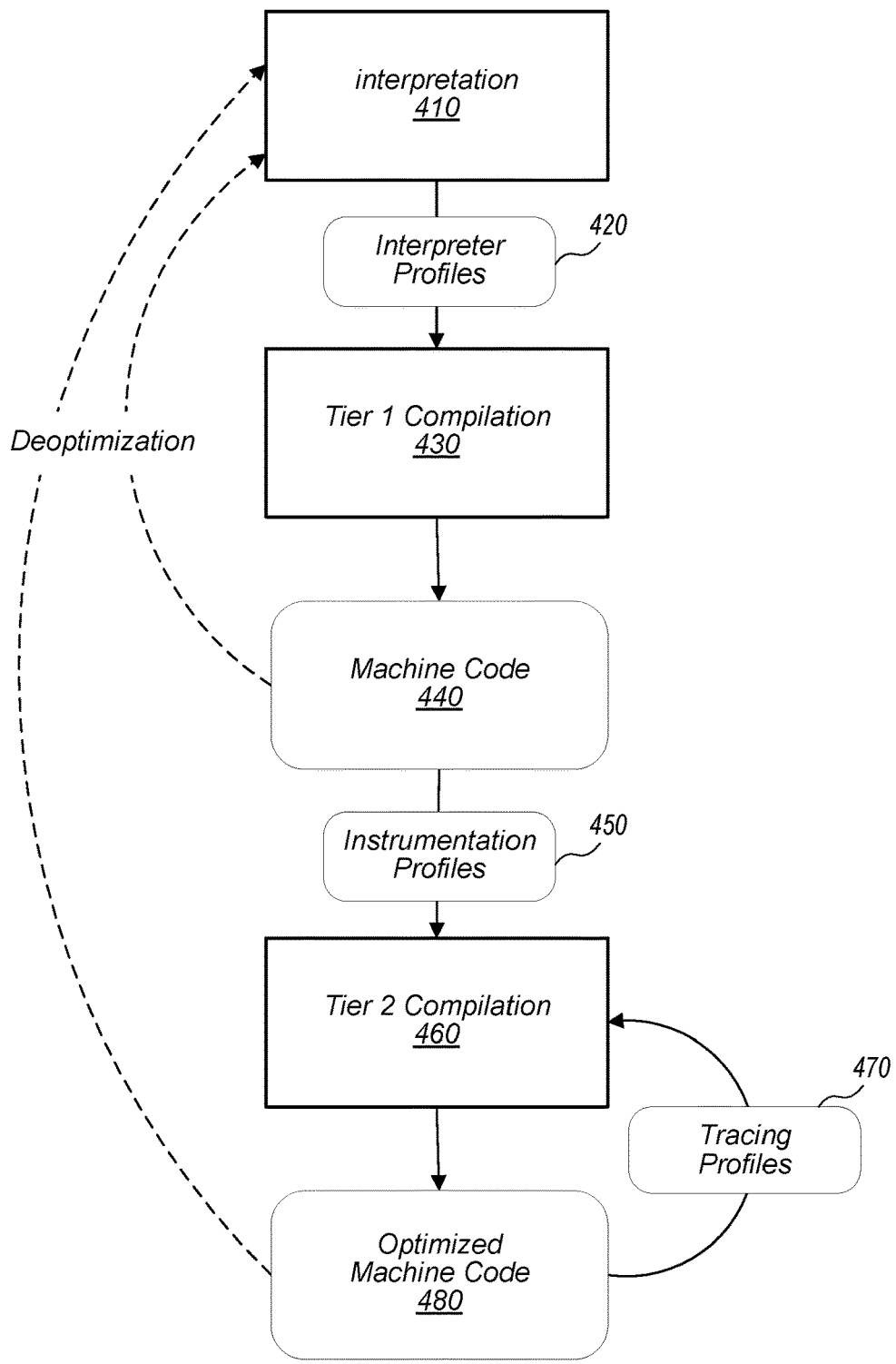
FIG. 4 is a logical block diagram illustrating a compilation pipeline of an optimizing dynamic compiler, as in one embodiment.

In some embodiments, binary hardware tracing of the optimized machine code generated by the last tier in a just-in-time compilation pipeline may be performed utilizing hardware features, as depicted in FIG. 4. FIG. 4 is a logical block diagram illustrating a compilation pipeline of an optimizing dynamic compiler, as in one embodiment. A compilation pipeline may include various logical stages, such as interpretation 410, tier 1 compilation 430, and tier 2 compilation 460. FIG. 4 also illustrates the control flow between the various stages as well as some of the results of the stages. For example, interpretation 410 may result in one or more interpreter profiles 420, tier 1 compilation may generate machine code 440, which may be used to generate one or more instrumentation profiles 450 and tier 2 compilation may generate optimized machine code 480, potentially iteratively using tracing profiles 470.

Thus, application threads may not always run optimized machine code. For example, while the application is warming up (e.g., during the start of the application's execution) or when the machine code de-optimizes (such as due to a failed speculation), interpreted and/or less optimized machine code, such as machine code 440 may be executed. Moreover, the machine code might not include all the control-flow paths compiled, thereby possibly necessitating a fallback (i.e., uncommon branch trap) to the interpreter or less-optimized machine code, according to some embodiments.

Figure 5:
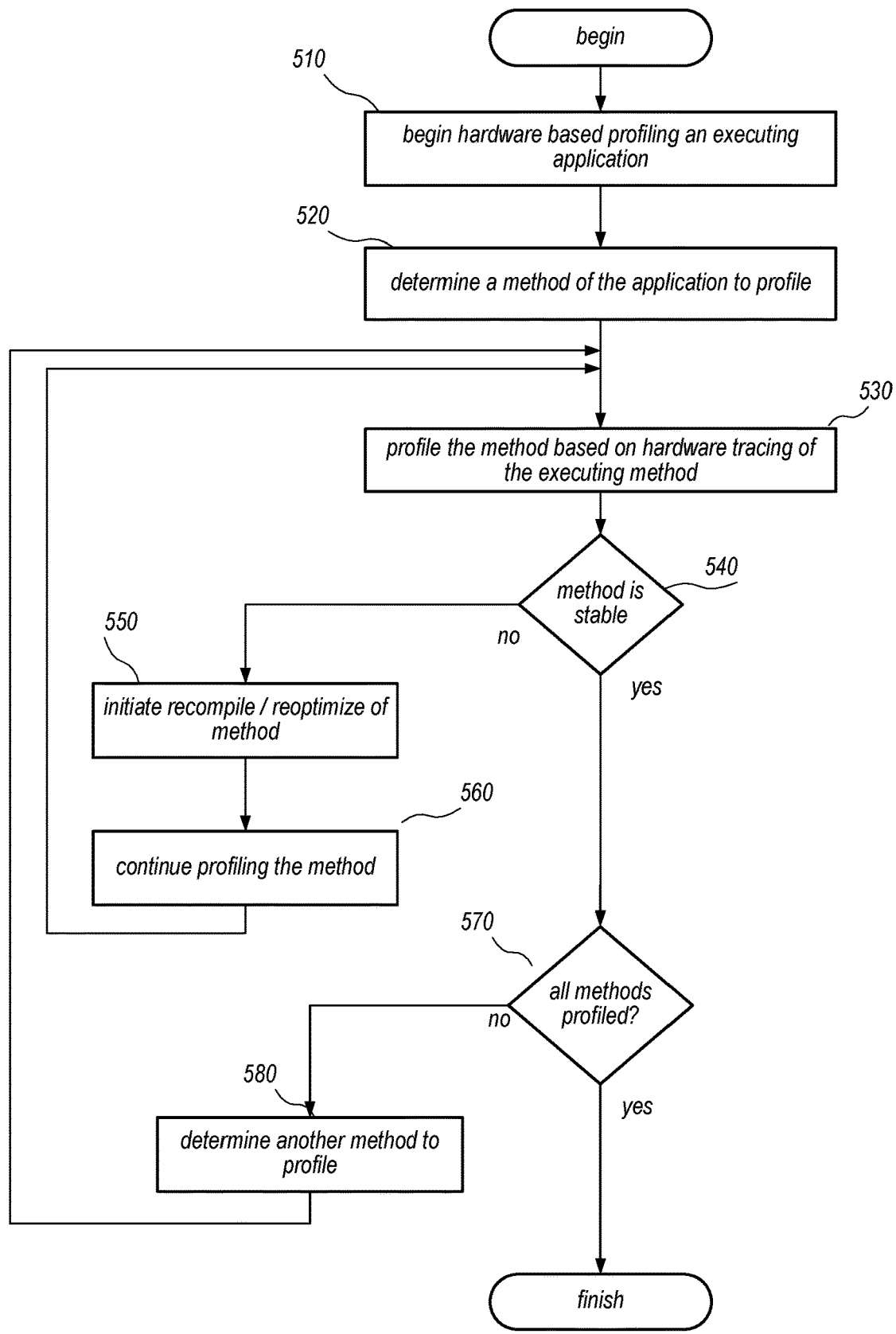
FIG. 5 is a flowchart illustrating one embodiment of a method for profiling and optimizing an application using hardware tracing.

FIG. 5 is a flowchart illustrating one embodiment of a method for profiling/optimizing an application using optimized recompilation using hardware tracing as described herein. As shown in block 510, tracing controller 170 may initiate hardware based profiling of an executing application 130. For instance, application 130 may be executing on a processor 110 of system 100 configured to provide one or more binary execution trace mechanisms. Tracing controller 170 may initiate hardware tracing in any of various manners, such as by executing one or more hardware instructions of processor 110 and/or loading one or more registers (or addresses) within processor 110 with relevant information regarding an application, thread(s), method(s) and/or address range(s) to be traced. In general, the particular manner and or method used to initiate or begin hardware tracing may vary from embodiment to embodiment.

As shown in block 520, tracing controller 170 may determine a method of the application to profile. For example, in one embodiment the tracing controller may be configured to rank some or all of the methods of the application based on their respective contribution to the total execution time of the application and trace the method(s) that contribute the most to the overall execution time before profiling methods that contribute less to the total execution time. As described herein methods that contribute significantly (e.g., relatively more than other methods) to the overall execution time may be considered 'hot' methods. Because any optimization performed for the hottest methods is likely to contribute more to overall performance improvements, tracing controller 170 may trace (some number of) the hottest methods first. For example, in one embodiment, the controller may trace the top F hottest methods until one or more of those methods are marked as stable. After enough profiling data are collected and the controller may determine that a method is stable (e.g., based on some criteria as will be described subsequently), the controller may stop tracing stable methods and begin to trace less hot methods (e.g., according to a sorted hot methods list).

Tracing controller 170 may then profile the determined method (e.g., one of the hot methods) based on hardware tracing of the executing method, as in block 530. For instance, the compiler may utilize one or more binary execution trace mechanisms of the processor(s) on which the application is executing. The binary execution trace mechanism may generate a trace enabling the tracing controller (or other post-processing software) to reconstruct the control flow of the method (i.e., decode the trace), including various types of data, such as outcomes of conditional branches, target addresses of indirect jumps and calls, as well as sources and targets of asynchronous control transfers (e.g., exceptions, interrupts), according to various embodiments. The exact data to be recorded in the trace may be determined by the processor, may be configurable (e.g., by the tracing controller, an administrator and/or user) and/or may vary from embodiment to embodiment.

If tracing controller 170 determines that the method is stable, as will be described in more detail subsequently, as indicated by the positive output of decision block 540, tracing controller 170 may determine another method to profile if there are additional methods to be profiled, as shown by block 580 and the negative output of decision block 570. If, however, tracing controller 170 determines that the method is not stable, as indicated by the negative output of decision block 540, tracing controller 170 may initiate a recompilation and/or re-optimization of the method and then continue profiling the method as shown in blocks 550 and 560.

Thus, tracing controller 170 may continue to profile and/or optimize the application until all methods (or at least all relevant methods) have been profiled and/or are determined to be stable. For instance, tracing controller 170 may only profile/optimize the N hottest methods of the application in one embodiment. In other embodiments, tracing controller 170 may profile/optimize all methods in application 130 or may profile/optimize for a certain amount of time—profiling/optimizing as many methods 140 as can be done during that time, etc.

As noted above, reducing the amount of data emitted by hardware tracing may minimize the data rate, but consequently may place a burden on decoding software. In some embodiments, a decoder library, such as decoder 180, may be utilized to decode traces. Decoder 180 may be configured to decode traces at a variety of levels: simple decoding of the emitted packets by type; basic blocks; and/or complete control flow and instruction decoding. Decoding at a higher level of detail generally slows decoding. For instance, full decoding may be a thousand times slower than the original execution, in some embodiments. Decoding at the basic block level may be sufficient for the techniques described herein according to some embodiments. For instance, embodiments that utilize (or rely on) branch direction and target profiles extracted from binary execution traces may utilize basic block level decoding.

While some decoder libraries may be implemented in a relatively naive manner, in some embodiments, higher-performing decoders may be used, potentially at the cost of additional complexity. For example, a trace may be easily segmented and individual segments processed in parallel. Additionally, abstracted traces may be generated from binaries which can be compared for divergence from expected behavior at lower performance cost than full decoding, according to some embodiments.

At a high optimization level, an optimizing compiler, such as compiler 160, may no longer emit instrumentation code, and so an execution environment (such as a VM) may have lower visibility into the behavior of optimized code. Low-overhead control flow traces may have several uses, such as a source of branch behavior, to determine the relative taken/not-taken probabilities of branches, to build a histogram of targets of indirect calls, jumps and returns, to obtain path profiles, to augment event information with context, e.g., what was the preceding behavior that led to an uncommon branch or trap and subsequent deoptimization.

Additionally, in some embodiments, a binary execution trace mechanism, may be combined with other hardware performance observation techniques (e.g., counters, instruction sampling, etc.). Such a combination may improve data obtained from these other mechanisms, according to some embodiments.

In some embodiments, optimized recompilation using hardware tracing may involve tracing selectively. For example, tracing controller 170 may be configured to select between tracing the content of a single execution loop or the entirety of a method. In some embodiments, tracing controller 170 may take advantage of address filters, which may limit tracing to stated address ranges, of binary execution trace mechanisms of processor 110. For instance, a binary execution trace mechanism (and/or a processor providing one or more binary execution trace mechanisms) may provide for only a limited number of address filters, which may limit tracing to certain address ranges that can further reduce the generated trace data rate. In some embodiments, only two filters may be supported. In some embodiments, controller 170 may be configured to time-multiplex the supported address filters among the methods to be traced so that a higher number of methods may be traced than the number of supported address filters.

When profiling an application, performing binary tracing for all instructions executed by the application may result in wasted resources, such as due to tracing and/or post-processing of traces. To avoid resource waste, in some embodiments tracing controller 170 and/or compiler 160 may determine one or more application methods that may contribute relatively more than other methods to the total execution time of the application. The determined methods may then be selected for tracing, profiling, recompiling and/or reoptimizing, according to various embodiments. In other embodiments, methods may be selected based on other criteria, such as their relative contribution to the overall instruction count of the application.

To determine which methods to trace, the tracing controller may maintain address-range metadata for methods compiled by the final compilation tier. For example, in one embodiment, the controller may maintain a map where each key represents (or identifies) the address range of a method. The controller may employ sampling-based hardware performance counters to obtain the addresses of retired instructions (e.g., instructions that were actually executed as part of the application flow as opposed to instructions that may be speculatively executed). As the retired instruction addresses are gathered, the controller may perform lookups in the address-range map and upon a match may increment the counter associated with the matching method. Thus, the controller may in some embodiments build a histogram of compiled methods' respective contribution to the total instruction count of the application. After sorting the histogram, the controller may then identify the top N methods to trace, which may be considered the 'hottest' methods. Similarly, a histogram representing methods' respective contribution to the overall execution time of the application may also be generated and used to determine an order in which method may be profiled.

Figure 6:
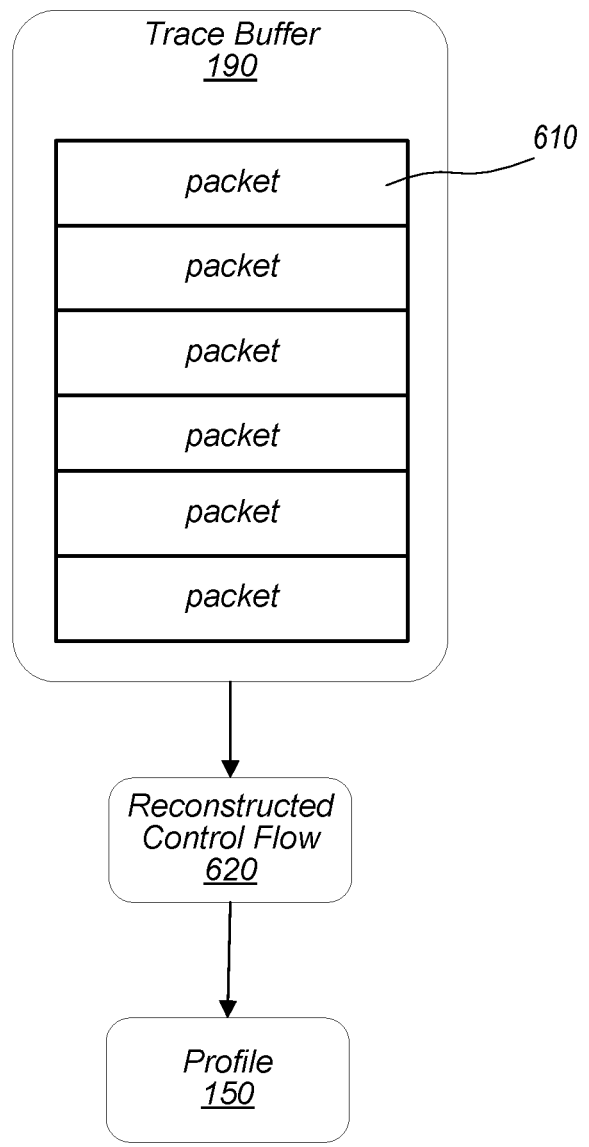
FIG. 6 is a logical block diagram illustrating the generation of a profile as part of optimized recompilation using hardware tracing, in one embodiment.

FIG. 6 is a logical block diagram illustrating the generation of a profile as part of optimized recompilation using hardware tracing, in one embodiment. As described above, trace controller 170 may be configured to initiate hardware tracing of (at least a portion of) an executing application. In response, processor 110 may generate trace data based on the execution of the traced code. For example, processor 110 may generate one or more packets 610 of trace data and store them in trace buffer 190.

In some embodiments, the controller may, during tracing, trigger control flow reconstruction whenever the trace buffer is filled. For example, in one embodiment, trace buffer 190 may be, or may include, a circular trace buffer. Whenever the circular trace buffer wraps around, tracing controller 170 may initiate control flow reconstruction based on information within trace buffer 190 to generate reconstructed control flow 620. Tracing may be paused until the content of the buffer is consumed by the decoder. In some embodiments, tracing controller 170 may utilize decoder 180 to decode the information in trace buffer 190 when reconstructing a control flow.

Tracing controller 170 may accumulate statistics about branch directions (i.e., number of times a branch instruction is executed and number of times it is taken) and/or call/jump targets (i.e., target addresses) as the decoder decodes the recorded trace (i.e., reconstructs control flow). The collected statistics may be included in, or used to generate, profile 150. Once the content of trace buffer 190 has been decoded and the corresponding control flow(s) reconstructed, tracing controller 170 may resume tracing. Once tracing of the executing code has been completed (e.g., when the traced method or other code being traced, but not necessarily the complete application, has finished execution) tracing controller 170 may post-process the profiles gathered, as described below according to various embodiments.

Making use of the profiles collected through hardware binary tracing during re-compilation may, in some embodiments, require mapping the profiles to the application's source code. This in turn may require the compiler to propagate source positions throughout the entire compilation pipeline and/or associate the source positions with their corresponding instructions in the generated machine code. Thus, profiles 150 collected through binary tracing of application 130 may be mapped back to the source code positions in application 130.

Figure 7:
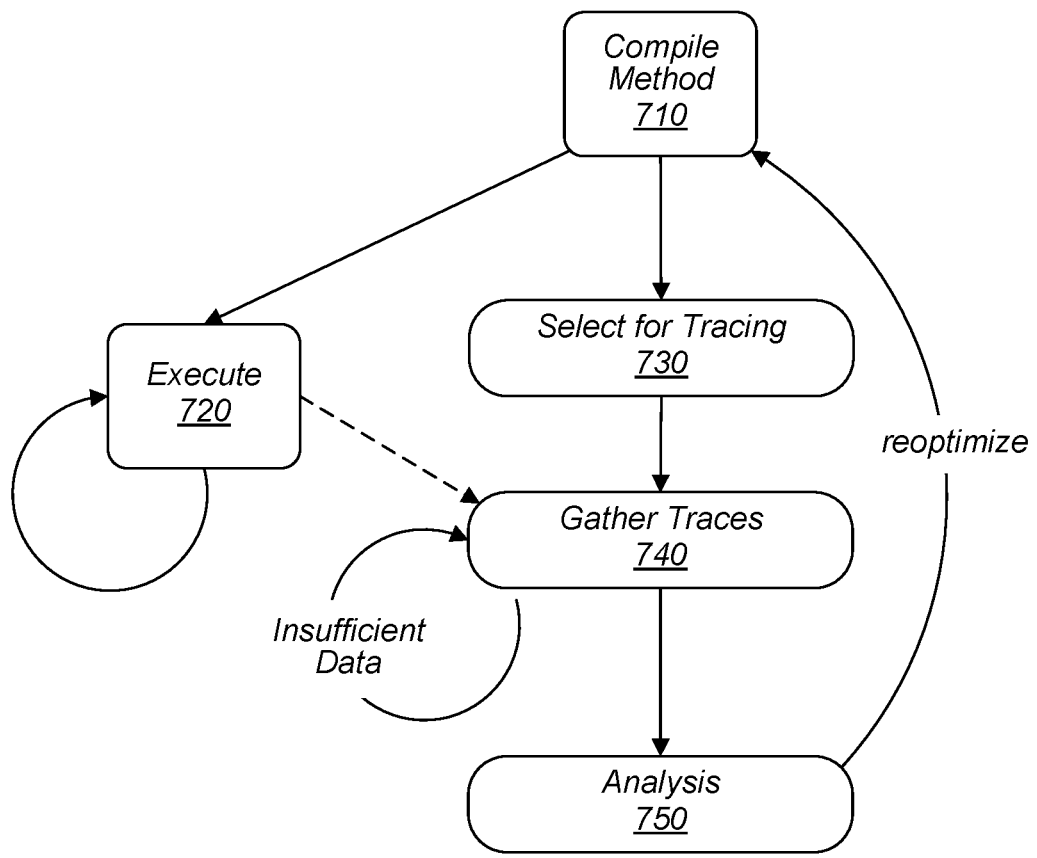
FIG. 7 is a logical block diagram illustrating a control flow for hardware tracing, in one embodiment.

After sufficient profiling data are collected (e.g., on average N instances per branch may be traced in a method according to some embodiments), tracing controller 170 may post-process the profiling data and decide whether recompilation is necessary for a given method. FIG. 7 is a logical block diagram illustrating the control flow for collecting, post-processing and utilize hardware traces, according to various embodiments. After a method is compiled as in block 710, and selected for tracing as in block 730, hardware traces may be gathered as in block 740 while the method is being executed as in block 720. After sufficient profiling data (e.g., tracing information) are collected, tracing controller 170 may analyze the collected trace data, as in block 750. As described above, in some embodiments, tracing controller 170 may compare a newly generated profile with one or more previously generated profiles to determine whether or not the traced method (or, in general, any collection of traced code) is stable or not.

For example, in one embodiment, tracing controller 170 may determine that a recompilation of a traced method may be necessary if the profile used for compilation differs significantly from profiles previously gathered, such as interpretation-based profiles, instrumentation based profiles and/or other hardware tracing based profiles. For example, if a branch was compiled with a 50% probability of being taken based on the interpreter profiles, but the hardware profiles indicate that it is taken all the time (probability=100%), this might be an indication that the branch behavior changes based on the context (i.e., the execution context, input data, etc.), and so might be worth recompiling with the recent profile. Comparing compile-time and run-time profiles collected through binary tracing may require maintaining profiling information used at compilation time for each source position, according to one embodiment.

In some embodiments, tracing controller 170 may decide whether to recompile a method by comparing compile-time and run-time profiles of relevant instructions (in some embodiments of all relevant instructions). If the majority of the compared profiles are similar (e.g., within some predetermined and/or configurable threshold) the method may not contain any context-dependent elements and/or there has been no phase change since the method was last profiled. In this case, the controller may determine not to recompile the methods, may mark the method as stable (e.g., so the method may not be traced anymore). Tracing controller 170 may then trace methods (e.g., from the hot methods list) that contribute less to the total execution time than methods already traced/profiled (e.g., less-hot or colder methods).

However, if the majority of the compile-time and run-time profiles differ (i.e., differ more than a predetermined and/or configurable threshold), the method may be considered a good candidate for recompilation by the controller. Recompiling a method whose compile-time and run-time profiles are different may result in improved performance due to performing context-sensitive and phase-specific optimizations, according to some embodiments.

As noted above, hardware tracing may provide context-sensitive profiling of methods that are already inlined in their respective caller method.

To provide context sensitivity, prior work has proposed profile collection mechanisms a) through instrumentation in the less-optimized machine code compiled in early stages in a multi-tier compilation pipeline and b) in the interpreter. Despite their performance and code size reduction benefits thanks to context sensitivity, these prior mechanisms suffer from the same drawbacks as their context-insensitive counterparts. First, because this kind of profiling mechanism is software based, they slow down the execution of the main application due to the extra instructions that need to be executed for profiling. Second, the interpreter-based approach is language specific and each language interpreter must implement its own profiler even if multiple languages can use a single compiler.

The following example Java™ code listing illustrates, according to one example embodiment, where context insensitive profiling may result in missing optimization opportunities that may be recognized by context sensitive profiling, such as may be implemented by one or more techniques for optimized recompilation using hardware tracing described herein according to various embodiments.

```
class BaseType {
   int key;
   public BaseType(int key) {
      this.key = key;
   }
}
class Type1 extends BaseType {
   public Type1(int key) {
      super(key);
   }
   public int hashCode( ){ /** Implementation **/ }
   public boolean equals(Object other) { /** Implementation **/ }
}
class Type2 extends BaseType {
   public Type2(int key) {
      super(key);
   }
   public int hashCode( ){ /** Implementation **/ }
   public boolean equals(Object other) { /** Implementation **/ }
}
class HashMapExample {
   static int counter = 0;
   public static void main( ) {
      Type1 type1Object = new Type1(1);
      Type2 type2Object = new Type2(2);
      HashMap<BaseType, Integer> map = new HashMap< >( );
      map.put(type1Object, 1);
      map.put(type2Object, 2);
      addToCounter(map, type1Object); /** Call-site 1 (CS1) **/
      addToCounter(map, type2Object); /** Call-site 2 (CS2) **/
   }
   public static void addToCounter(HashMap<BaseType, Integer>
         map, BaseType object) {
      counter += map.get(object).intValue( );
   }
}
class HashMap {
   // Simplified HashMap.get
   public Object get(Object key) {
      int index = maskIndex(key.hashCode( ));
```

-continued

```
        HashMapEntry entry = elementData[index];
        while (entry != null) {
            // ...
            return entry;
        }
        return null;
    }
}
```

Figure 8A:
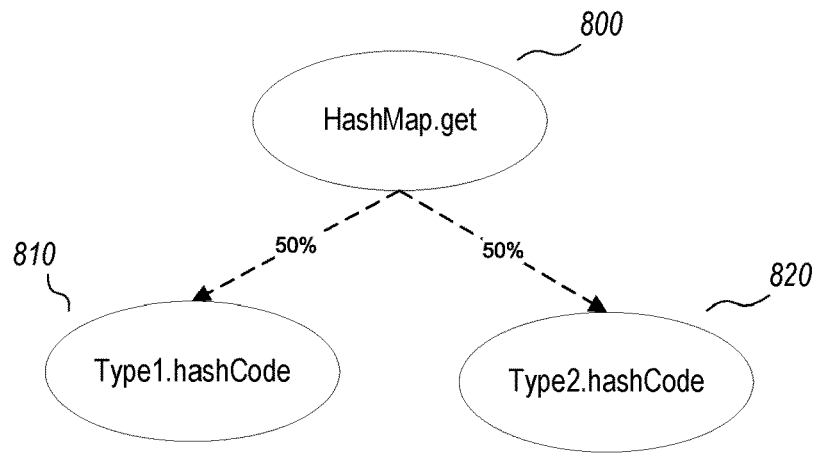
FIGS. 8A and 8B is a logical block diagram illustrating differences between context insensitive and context sensitive profiling, in one embodiment.

For example, in the example code snippet listed above (according to one example embodiment), the get method of HashMap is called by two call sites in the addToCounter method and each call site calls first addToCounter then HashMap.get with an instance of two different types, Type 1 and Type2, as arguments. In a system performing context-insensitive profiling, as illustrated in FIG. 8A, the type profiles collected for the invocation of hashCode in the get method would be 50% for both Type1.hashCode 810 and Type2.hashCode 820, such as because the profiler may not keep track of the call contexts of HashMap.get 800. Thus, because the probabilities of the two types are equal, the inliner might inline either both hashCode methods or neither, as there is no winner case; (e.g., neither of two types is more common).

Figure 8B:
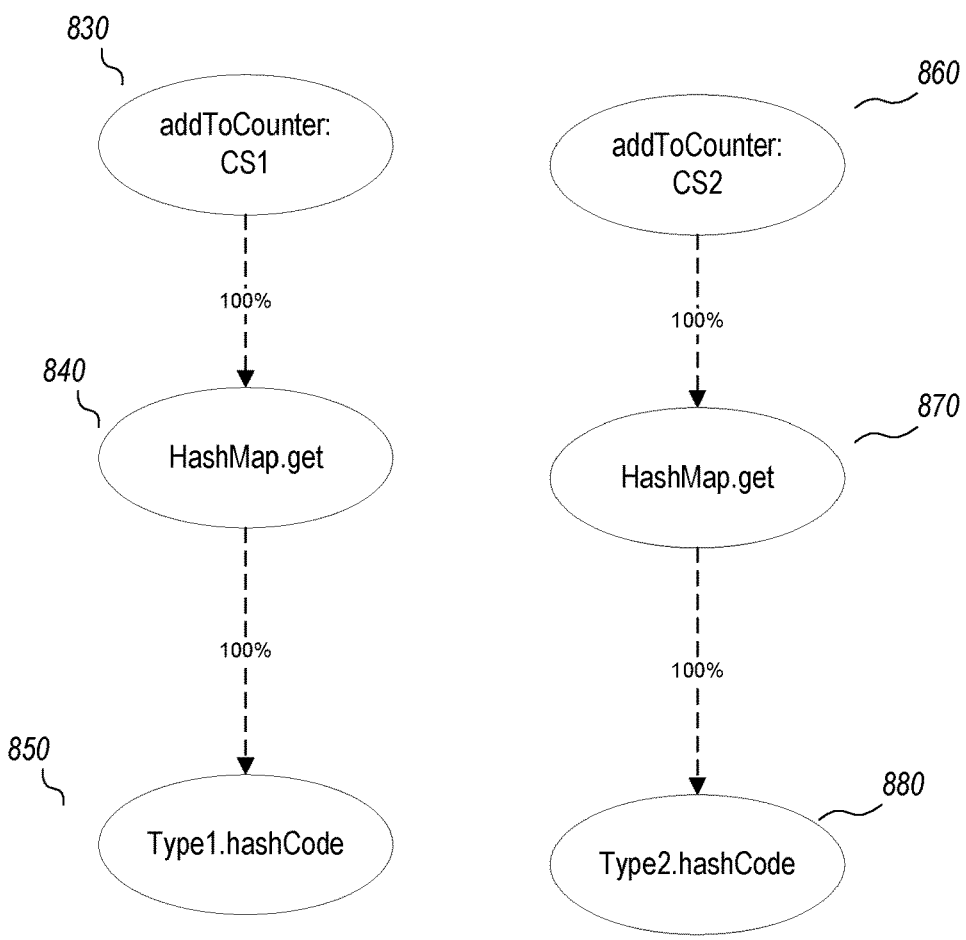

Unlike context-insensitive profilers, a context-sensitive profiler, such as one configured to implement one or more of the techniques for optimized recompilation using hardware tracing described herein, may differentiate between the two call sites of HashMap.get 840 and 870 in addToCounter and may associate the profiles with each call site separately, as illustrated in FIG. 8B. As shown in the following example source code listing according to one embodiment, the type profile for the hashCode call in get would be 100% of Type1 850 for Call Site 1 830 and 100% of Type2 880 for Call Site 2 860. In this case, because there is a clear winner at both call sites, an inliner (e.g., of compiler 160) may inline the correct method at each call site, that is, Type1.hashCode 850 in addToCounter.CS1 830 and Type2.hashCode 880 in addToCounter.CS1 860.

Figure 9:
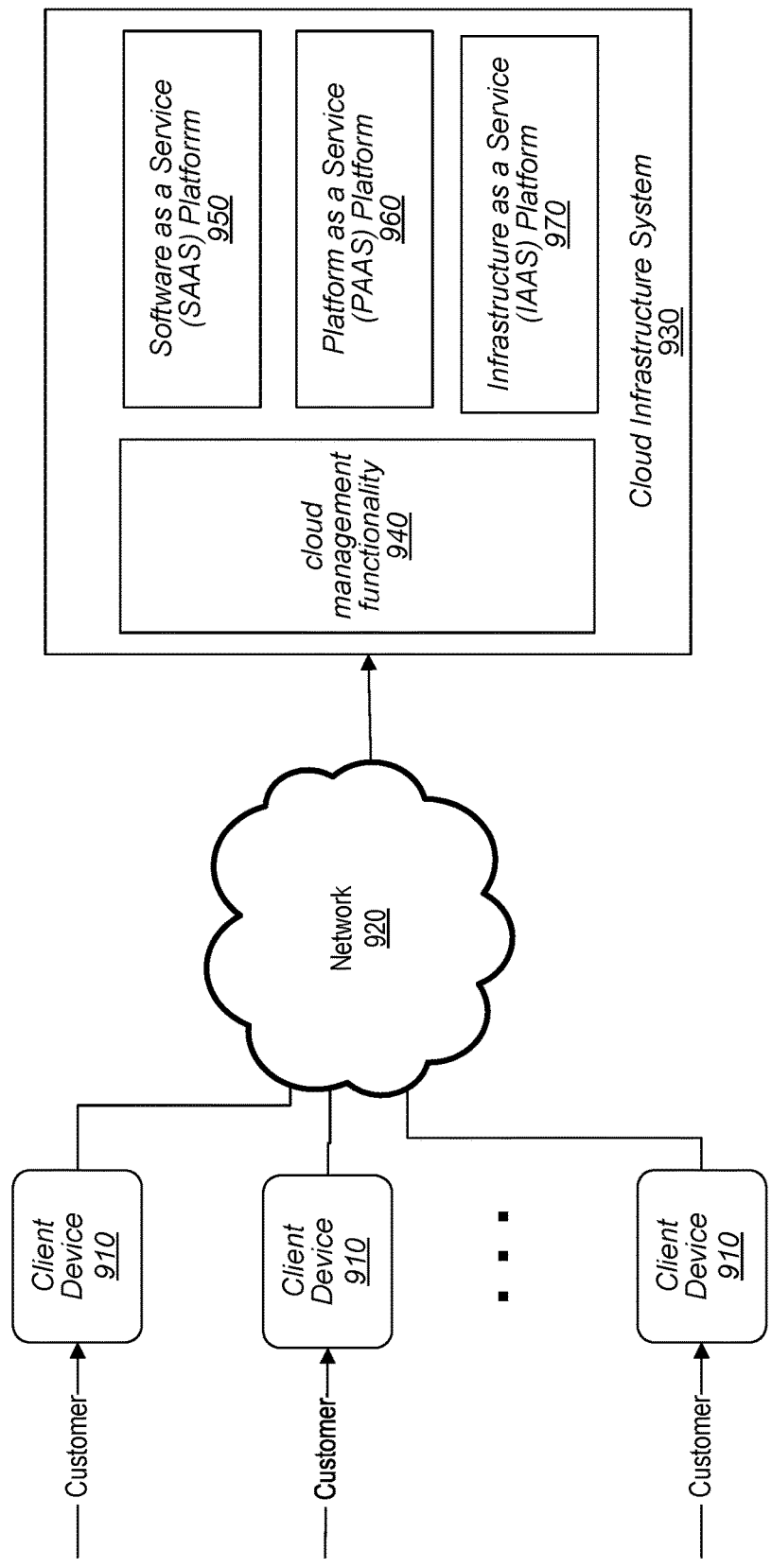
FIG. 9 is a is a logical block diagram illustrating one environment suitable for implementing optimized recompilation using hardware tracing, in one embodiment.

While described herein as being implemented and/or performed on stand-alone computer systems, optimized recompilation using hardware tracing described herein may also be implemented using resources of a cloud computing environment, as illustrated in FIG. 9 which illustrates a cloud computing environment configured to implement the methods, mechanisms and/or techniques described herein according to one embodiment. For example, cloud infrastructure system 930 may provide a variety of services via a cloud or network environment. These services may include one or more services provided under Software as a Service (SaaS) category, Platform as a Service (PaaS) category, Infrastructure as a Service (IaaS) category, or other categories of services including hybrid services.

As shown in FIG. 9, cloud infrastructure system 930 may comprise multiple components, which working in conjunction, enable provision of services provided by cloud infrastructure system 930. In some embodiments, cloud infrastructure system 930 may include a SaaS platform 950, a PaaS platform 960, an IaaS platform 970, and cloud management functionality 940. These components may be implemented in hardware, or software, or combinations thereof, according to various embodiments.

The provided services may be accessible over network 920 (e.g., the Internet) by one or more customers via client device(s) 910. Thus, in some embodiments, cloud infrastructure system 930 may include, host, provision and/or provide any and or all of processor(s) 110, execution environment 120, application 130, compiler 160, tracing controller 170, and/or decoder 180 to customers over network 920. Thus, in some embodiments, optimized recompilation using hardware tracing, including the methods, mechanisms and/or techniques described herein, may be implemented and/or provided as part of an SAAS platform, PAAS platform and/or IAAS platform offered by a cloud infrastructure system.

In addition to recording the flow of control, a binary execution trace mechanism may be configured to annotate the trace with timing information (e.g., high-precision and/or cycle-accurate timing information). Two types of information may be available: (i) time, such as may be measured by a real-time clock, and/or (ii) the ratio of the core's clock cycle to the bus clock cycle. A record including a new ratio may be emitted into the trace whenever the ratio changes, according to some embodiments. A record of dynamic frequency changes, such as may be caused by dynamically switched processor clock speeds (e.g., in response to thermal events) may be utilized to account for performance variations, and may make easier to identify variations due to other effects, such as cache hits and misses. Additionally, in some embodiments high-precision timed traces may enable more detailed regression analysis.

Thus, optimized recompilation using hardware tracing may provide extensive, as well as context-sensitive, profiling data for an executing application, and may deliver application performance improvements, such as by providing improved guidance of compiler optimizations, according to various embodiments.

Computing System Example

Figure 10:
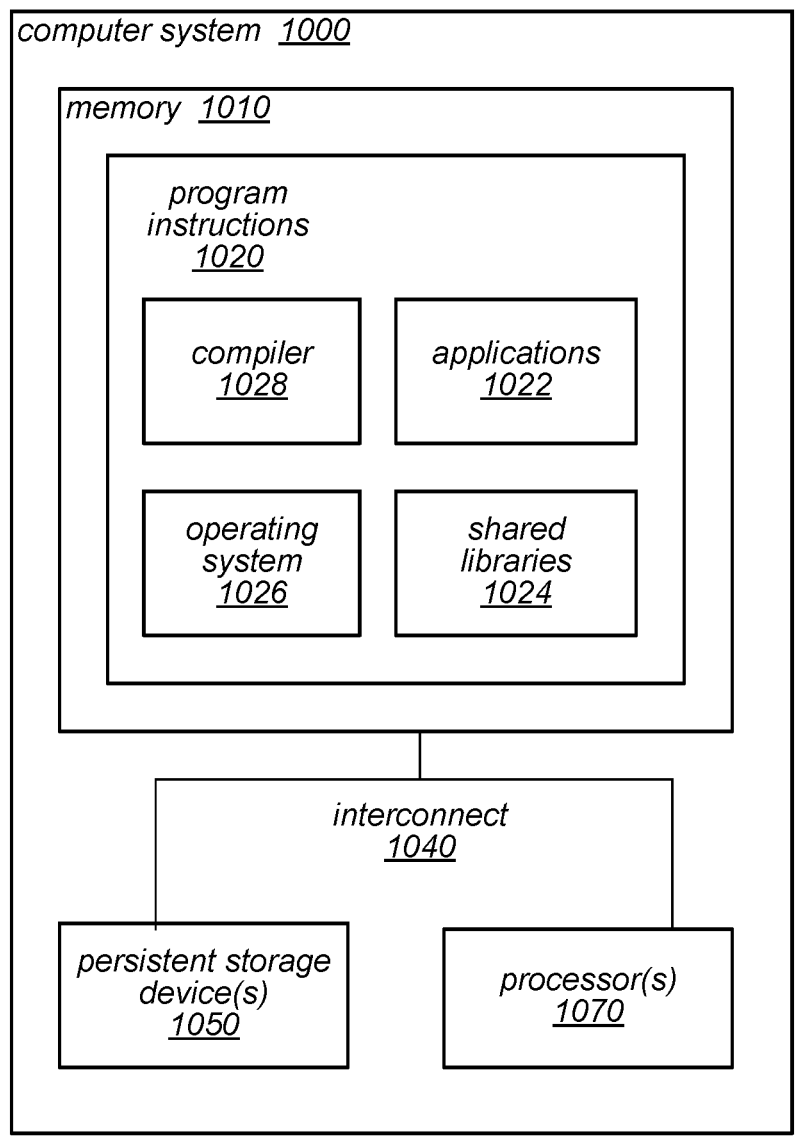
FIG. 10 is a block diagram illustrating a computing system configured to implement the disclosed techniques, according to one embodiment.

The systems and methods described herein may be implemented on or by any of a variety of computing systems, in different embodiments. FIG. 10 illustrates a computing system 1000 that is configured to implement the disclosed techniques, according to various embodiments. The computer system 1000 may be any of various types of devices, including, but not limited to, a personal computer system, desktop computer, laptop or notebook computer, mainframe computer system, cloud computing system, handheld computer, workstation, network computer, a consumer device, application server, storage device, a peripheral device such as a switch, modem, router, etc., or in general any type of computing device.

The mechanisms for implementing the techniques described herein, may be provided as a computer program product, or software, that may include a non-transitory, computer-readable storage medium having stored thereon instructions, which may be used to program a computer system 1000 (or other electronic devices) to perform a process according to various embodiments. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.).

In various embodiments, computer system 1000 may include one or more processors 1070, such as one or more tracing capable processors 110, each of which may include multiple cores and any of which may be single or multi-threaded. For example, multiple processor cores may be included in a single processor chip (e.g., a single processor 1070), and multiple processor chips may be included in computer system 1000. The computer system 1000 may also include one or more persistent storage devices 1050 (e.g. optical storage, magnetic storage, hard drive, tape drive, solid state memory, etc.) and one or more system memories 1010 (e.g., one or more of cache, SRAM, DRAM, RDRAM, EDO RAM, DDR 10 RAM, SDRAM, Rambus RAM, EEPROM, etc.). Various embodiments may include fewer or additional components not illustrated in FIG. 10 (e.g., video cards, audio cards, additional network interfaces, peripheral devices, a network interface such as an ATM interface, an Ethernet interface, a Frame Relay interface, etc.)

The one or more processors 1070, the storage device(s) 1050, and the system memory 1010 may be coupled to the system interconnect 1040. One or more of the system memories 1010 may contain program instructions 1020. Program instructions 1020 may be executable to implement one or more applications 1022, such as application 130, compiler 160, tracing controller 170 and/or decoder 190. Program instructions 1020 may be executable to implement shared libraries 1024, and/or operating systems 1026. In some embodiments, program instructions 1020 may include a compiler 1028, such as compiler 160. In some embodiments, compiler 1028 may be an optimizing compiler that is configured to apply one or more transformations and/or optimizations to application or library code that is executable to implement the disclosed methods, techniques and/or mechanisms.

Program instructions 1020 may be encoded in platform native binary, any interpreted language such as Java™ byte-code, or in any other language such as C/C++, Java™, etc. or in any combination thereof. In various embodiments, compiler 1028, applications 1022, operating system 1026, and/or shared libraries 1024 may each be implemented in any of various programming languages or methods. For example, in one embodiment, compiler 1028 and operating system 1026 may be Java based, while in another embodiment they may be written using the C or C++ programming languages. Similarly, applications 1022 may be written using Java, C, C++, or another programming language, according to various embodiments. Moreover, in some embodiments, compiler 1028, applications 1022, operating system 1026, and/shared libraries 1024 may not be implemented using the same programming language. For example, applications 1022 may be Java based, while compiler 1028 may be developed using C or C++.

The program instructions 1020 may include operations, or procedures, and/or other processes for implementing the techniques described herein. Such support and functions may exist in one or more of the shared libraries 1024, operating systems 1026, compiler 1028, applications 1022, compiler 160, tracing controller 170, and/or, decoder 180, in various embodiments.

Although the embodiments above have been described in considerable detail, numerous variations and modifications will become apparent to those skilled in the art once the above disclosure is fully appreciated. For example, although many of the embodiments are described in terms of particular types of lock structures, policies, and procedures particular, it should be noted that the techniques and mechanisms disclosed herein may be applicable in other contexts in which critical sections of code and/or shared resources may be protected by other types of locks/structures under different policies or procedures than those described in the examples herein. It is intended that the following claims be interpreted to embrace all such variations and modifications.

What is claimed:

1. A computing device, comprising:
 a processor comprising one or more hardware tracing address ranges and configured to generate hardware tracing information for an application; and
 a memory comprising program instructions that, when executed on the processor or another processor, cause the processor or another processor to implement a tracing controller configured to:
  select a portion of the application to trace, the selected portion comprising one or more ranges of optimized program instructions emitted by a compiler and respectively corresponding to the one or more hardware tracing address ranges of the processor, wherein the application does not include profiling instrumentation information for the optimized program instructions emitted by the compiler, and wherein the selecting is based at least in part on respective contributions of optimized program instructions to a total execution time of the application;
  load the hardware tracing address ranges of the processor with the respective one or more ranges of optimized program instructions of the selected portion of the application;
  instruct the processor to generate hardware tracing information for the selected portion of the application; and
  initiate re-compilation of at least some of the selected portion of the application based at least in part on the generated hardware tracing information.

2. The computing device of claim 1, wherein the application further comprises one or more portions of de-optimized program instructions, and wherein the selected portion of the application excludes the one or more portions of de-optimized program instructions.

3. The computing device of claim 1, wherein the re-compilation causes at least another portion of the application to be de-optimized, and wherein the tracing controller is further configured to select another portion of the application to trace, the other selected portion excluding at least the de-optimized other portion of the application.

4. The computing device of claim 1, wherein the re-compilation is initiated responsive to determining that a new profile based at least on the generated hardware tracing information differs more than a threshold amount from a previously generated profile for the selected portion of the application.

5. The computing device of claim 4, wherein in response to determining that the new profile does not differ more than the threshold amount from the previously generated profile, the tracing controller is further configured to:
 instruct the one or more processors to discontinue hardware tracing of the selected portion; and
 instruct the one or more processors to initiate hardware tracing of another portion of the application.

6. The computing device of claim 4, wherein the previously generated profile is generated by an interpreter prior to the processor generating the hardware tracing information of the selected portion.

7. The computing device of claim 4, wherein the previously generated profile is generated based on hardware tracing information generated prior to generating the hardware tracing information upon which the new profile is based.

8. The computing device of claim 1, wherein the hardware tracing information comprises one or more of:
   an outcome of one or more conditional branches within the portion;
   a target address of an indirect jump within the portion;
   a target address of an indirect call within the portion; and
   a source and target of an asynchronous control transfer within the portion.

9. The computing device of claim 1, wherein a new profile comprises statistics regarding branch directions, wherein the statistics comprise:
   a number of times a conditional branch instruction is executed within the portion; and
   a number of times the conditional branch instruction is taken.

10. A computer-implemented method, comprising:
   selecting a portion of an application to trace, the selected portion comprising one or more ranges of optimized program instructions emitted by a compiler and respectively corresponding to one or more hardware tracing address ranges of a processor executing the application, wherein the application does not include profiling instrumentation information for the optimized program instructions emitted by the compiler, and wherein the selecting is based at least in part on respective contributions of optimized program instructions to a total execution time of the application;
   loading the hardware tracing address ranges of the processor with the respective one or more ranges of optimized program instructions of the selected portion of the application;
   instructing the processor to generate hardware tracing information for the selected portion of the application; and
   initiating re-compilation of at least some of the selected portion of the application based at least in part on the generated hardware tracing information.

11. The method of claim 10, wherein the application further comprises one or more portions of de-optimized program instructions, and wherein the selected portion of the application excludes the one or more portions of de-optimized program instructions.

12. The method of claim 10, wherein the re-compilation causes at least another portion of the application to be de-optimized, and wherein a tracing controller is further configured to select another portion of the application to trace, the other selected portion excluding at least the de-optimized other portion of the application.

13. The method of claim 10, wherein the re-compilation is initiated responsive to determining that a new profile based at least on the generated hardware tracing information differs more than a threshold amount from a previously generated profile for the selected portion of the application.

14. The method of claim 13 wherein the previously generated profile is generated by an interpreter prior to the processor generating the hardware tracing information of the selected portion.

15. The method of claim 13, wherein the previously generated profile is generated based on hardware tracing information generated prior to generating the hardware tracing information upon which the new profile is based.

16. The method of claim 10 wherein the hardware tracing information comprises one or more of:
   an outcome of one or more conditional branches within the portion;
   a target address of an indirect jump within the portion;
   a target address of an indirect call within the portion; and
   a source and target of an asynchronous control transfer within the portion.

17. One or more non-transitory, computer-readable storage media storing program instructions that when executed on or across one or more processors cause the one or more processors to perform:
   selecting a portion of an application to trace, the selected portion comprising one or more ranges of optimized program instructions emitted by a compiler and respectively corresponding to one or more hardware tracing address ranges of a processor executing the application, wherein the application does not include profiling instrumentation information for the optimized program instructions emitted by the compiler, and wherein the selecting is based at least in part on respective contributions of optimized program instructions to a total execution time of the application;
   loading the hardware tracing address ranges of the processor with the respective one or more ranges of optimized program instructions of the selected portion of the application;
   instructing the processor to generate hardware tracing information for the selected portion of the application; and
   initiating re-compilation of at least some of the selected portion of the application based at least in part on the generated hardware tracing information.

18. The one or more non-transitory, computer-readable storage media of claim 17, wherein the application further comprises one or more portions of de-optimized program instructions, and wherein the selected portion of the application excludes the one or more portions of de-optimized program instructions.

19. The one or more non-transitory, computer-readable storage media of claim 17, wherein the re-compilation causes at least another portion of the application to be de-optimized, and wherein the tracing controller is further configured to select another portion of the application to trace, the other selected portion excluding at least the de-optimized other portion of the application.

20. The one or more non-transitory, computer-readable storage media of claim 19, wherein the re-compilation is initiated responsive to determining that a new profile based at least on the generated hardware tracing information differs more than a threshold amount from a previously generated profile for the selected portion of the application.

* * * * *